United States Patent
Tan et al.

(10) Patent No.: US 10,236,153 B2
(45) Date of Patent: Mar. 19, 2019

(54) MULTIPLE KNOB STRUCTURE

(71) Applicant: Tymphany HK Limited, Wanchai (HK)

(72) Inventors: Kaijiu Tan, Huizhou (CN); Chang Shu, Shenzhen (CN)

(73) Assignee: TYMPHANY HK LIMITED, Wanchai (HK)

( * ) Notice: Subject to any disclaimer, the term of this patent is extended or adjusted under 35 U.S.C. 154(b) by 0 days.

(21) Appl. No.: 15/234,503

(22) Filed: Aug. 11, 2016

(65) Prior Publication Data

US 2018/0019087 A1  Jan. 18, 2018

(30) Foreign Application Priority Data

Jul. 14, 2016 (CN) .......................... 2016 1 0552385

(51) Int. Cl.
```
H01H 13/70     (2006.01)
H01H 89/00     (2006.01)
H01H 15/10     (2006.01)
H01H 19/08     (2006.01)
H01H 19/14     (2006.01)
```

(52) U.S. Cl.
CPC ............ *H01H 89/00* (2013.01); *H01H 13/70* (2013.01); *H01H 15/10* (2013.01); *H01H 19/08* (2013.01); *H01H 19/14* (2013.01); *H01H 2221/01* (2013.01)

(58) Field of Classification Search
CPC .... H01H 25/065; H01H 25/06; H01H 25/008; H01H 2019/146; H01H 2025/045; H01H 2025/046; H01H 89/00; H01H 19/14; H01H 15/10; H01H 19/08; H01H 13/70; H01H 2221/01
USPC ....... 200/4, 5 R, 61.54, 336, 11 R, 14, 16 R, 200/564, 570
See application file for complete search history.

(56) References Cited

U.S. PATENT DOCUMENTS

| | | | | |
|---|---|---|---|---|
| 6,867,379 B2 * | 3/2005 | Hayashi | ................... | G05G 1/08 200/4 |
| 2014/0042003 A1 * | 2/2014 | Meftah | .................. | H01H 3/022 200/334 |

* cited by examiner

*Primary Examiner* — Ahmed Saeed
(74) *Attorney, Agent, or Firm* — Cantor Colburn LLP

(57) ABSTRACT

A multiple knob structure including a knob top module having a head cover, a silicone keyboard and a head annular PCB, from top to bottom, a bearing module, which includes a bearing holder and a bearing, and a knob bottom module, which includes a bottom cover and a bottom PCB, where the knob bottom module also includes a torsional spring and a rotation damper, the torsional spring is mounted on an installing groove of the bottom cover, the rotation damper is mounted on a rotation damper installing groove of the bottom cover.

7 Claims, 2 Drawing Sheets

MULTIPLE KNOB STRUCTURE

CROSS REFERENCE TO RELATED APPLICATION

This application is related to and claims the benefit of Chinese Patent Application Number CN201610552385.1 filed on 14 Jul. 2016, the contents of which are herein incorporated by reference in their entirety.

FIELD OF THE INVENTION

The invention generally relates to knob modules, and especially to a new-type multiple knob structure.

BACKGROUND OF THE INVENTION

A knob is an electrical component for manual control in an electronic system. Generally, a knob is part of an electrical switch or regulating equipment. A knob is classified into three types, according to functional requirements and shape: circular knob, multilateral knob, and pointer knob, etc.

At present, a knob structure with double bearings and rotating potentiometer are commonly produced and used in the technology field of knob module. To achieve vertical movement and rotation movement along the axis of a knob, a structure of a linear bearing is setup to the knob structure with double bearings, on the basis of a normal bearing structure. However, the requirement of precision is high when manufacturing the knob structure with double bearings. Hence, production costs of a knob structure with double bearings would be high. A knob structure with a rotating potentiometer can be rotated and pressed. A knob structure with a rotating potentiometer is suitable for a knob with a minor diameter. However, it is not easy to rotate and press the knob when the knob structure with rotating potentiometer is applied to a knob with a major diameter. And it would be shaky and not steady when one rotates and presses the knob. Users often complain about a poor experience of knob control in such setups. Both the knob structures mentioned above limit their application on electrical switch and regulating equipment.

Therefore, there is a need to design and manufacture a knob structure with a simple structure, a lower cost, and that is suitable for knobs with varisized diameters.

BRIEF SUMMARY

To solve the problems mentioned above, the invention provides a new-type of multiple knob structure with multi-function, whose structure is simple and production cost is low. The multiple knob structure is suitable for knobs with varisized diameters, meeting requirements of the knob structure's application on electrical switch and regulating equipment.

A new-type multiple knob structure is provided herein including a knob top module, which includes a head cover, a silicone keyboard and a head annular PCB from top to bottom; a bearing module, which includes bearing holder and bearing; a knob bottom module, which includes bottom cover and bottom PCB.

Generally, in the disclosed multiple knob structure, the vertical press function and rotation function are usually merged into the same piece of printed circuit board. Generally, the vertical press function is setup on the head annular PCB and the rotation function is setup on the bottom PCB. This simplifies the integration manufacturing procedure of the PCB and achieves different functions on different places of the knob. What is more important is that it optimizes the knob structure and improves the consumer's experience when vertical pressing and rotating the knob.

More particularly, the knob bottom module also includes a torsional spring and a rotation damper; the torsional spring is mounted on an installing groove of the bottom cover; the rotation damper is mounted on a rotation damper installing groove of the bottom cover.

A bearing seat is setup on a middle axle of the bottom cover, the bearing is mounted on the bearing seat of the bottom cover.

As single bearing is setup as the main bearing structure of the multiple knob structure, it reduces production costs and avoids using the knob structure with double bearings, whose production cost would be high.

More particularly, a vertical press module is provided in this invention. The vertical press module is comprised of a head cover, a silicone keyboard, a head annular PCB, and a bearing holder.

The vertical press module is mounted on a periphery of the bearing, and it is mounted on the bottom cover with bolts.

The bearing, torsional spring and rotation damper are setup on the knob structure jointly. When rotating the knob clockwise or anticlockwise 30 degrees, it will trigger the knob to work, and the knob would springback automatically under the action of the torsional spring and the rotation damper.

To further describe the invention, nine pieces of button are setup on the silicone keyboard, and nine pieces of button triggers are setup on the head annular PCB, the buttons corresponding to the button triggers. When consumers press any point of the head cover, the knob would be triggered to work. This allows the vertical press function to be achieved easily.

A slide switch is setup on the bottom PCB of the knob bottom module, the slide switch triggers the knob to rotate.

Comparing to a conventional knob structure, the advantages of the invention are as below:

A new-type of multiple knob structure is provided which is suitable for applying in knobs with varisized diameters, meanwhile its structure is simple and only a single bearing with lower cost is setup as the main bearing structure. Therefore, it can meet the requirements of the knob structure's application on electrical switch and regulating equipment.

The knob structure simplifies the integration manufacturing procedure of the PCB and it achieve different functions on different places of the knob, such as the vertical press function setup on the head annular PCB and the rotation function setup on the bottom PCB, respectively. Also, it optimizes knob structure and improve consumer's experience when vertical pressing and rotating the knob.

The knob structure provides nine pieces of button setup on the silicone keyboard, and nine pieces of button triggers setup on the head annular PCB. The buttons correspond to the button triggers. Whenever consumers press any point of the head cover, the knob would be triggered to work. It saves labor and meets the requirement of achieving the vertical press function easily.

DETAILED DESCRIPTION

In order to fully comprehend the features and efficacy of the present disclosure, a detailed description is described by the following substantial embodiments in conjunction with the accompanying drawings. The description is as below.

Embodiment 1

Figure 1:
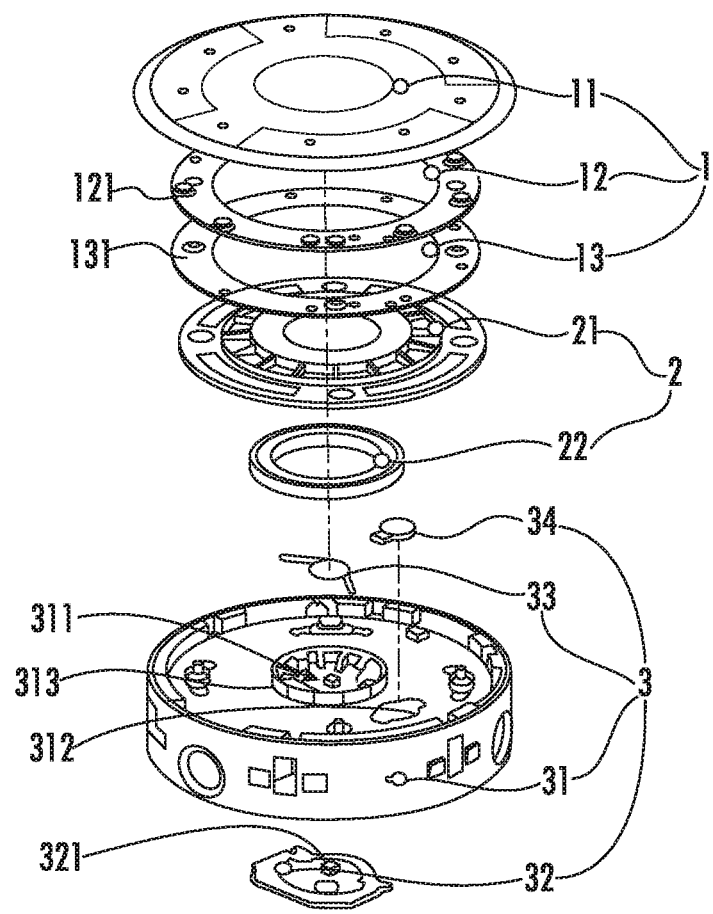
FIG. 1 is an exploded view of a new-type multiple knob structure in accordance with an embodiment of the disclosure.

Referring to FIG. 1, an exploded view is provided of a new-type of multiple knob structure in accordance with an embodiment of the disclosure. The disclosure provides a new-type multiple knob structure.

The knob structure comprises a knob top module 1, a bearing module 2 and a knob bottom module 3.

Therein the knob top module 1 includes a head cover 11, a silicone keyboard 12, and a head annular PCB 13 from top to bottom; the bearing module 2 includes a bearing holder 21 and a bearing 22; the knob bottom module 3 includes a bottom cover 31 and a bottom PCB 32.

More particularly, the knob bottom module 3 also includes a torsional spring 33 and a rotation damper 34; the torsional spring 33 is mounted on an installing groove 311 of the bottom cover 31; the rotation damper 34 is mounted on a rotation damper installing groove 312 of the bottom cover 31.

The vertical press function is set up on the head annular PCB 13 and the rotation function is setup on the bottom PCB 32. This simplifies the integration manufacturing procedure of the PCB and it achieves different functions on different places of the knob. It optimizes knob structure and improve consumer's experience when vertical pressing and rotating the knob.

In this embodiment, the bearing 22 is mounted on a bearing seat 313 of the bottom cover 31, the bearing seat 313 is setup on the middle axle of the bottom cover 31.

Figure 3:
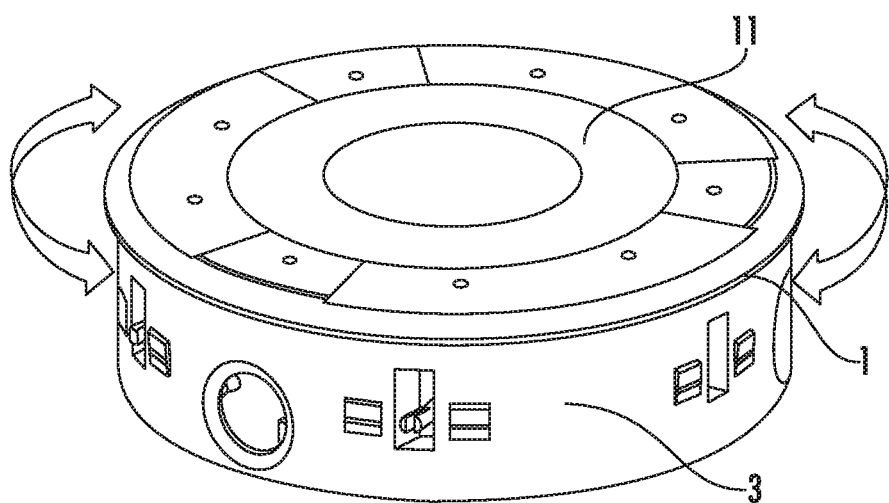
FIG. 3 is a rotating diagrammatic drawing of a new-type multiple knob structure in accordance with an embodiment of the disclosure.

Now referring to FIG. 3, a rotating diagrammatic drawing is provided of a new-type of multiple knob structure in accordance with an embodiment of the disclosure. To further describe the rotation function of the invention, the bearing 22, the torsional spring 33, and the rotation damper 34 are setup on the knob structure jointly. When rotating the knob clockwise or anticlockwise 30 degrees, it will trigger the knob to work and the knob would springback automatically under the action of the torsional spring 33 and the rotation damper 34.

For ease of illustration, a vertical press module is also provided by the disclosure, it is comprised of a head cover 11, a silicone keyboard 12, a head annular PCB 13, and a bearing holder 21;

The vertical press module is mounted on a periphery of the bearing 22. To further describe the location of the vertical press module, it is mounted on the bottom cover 31 with bolts.

Figure 2:
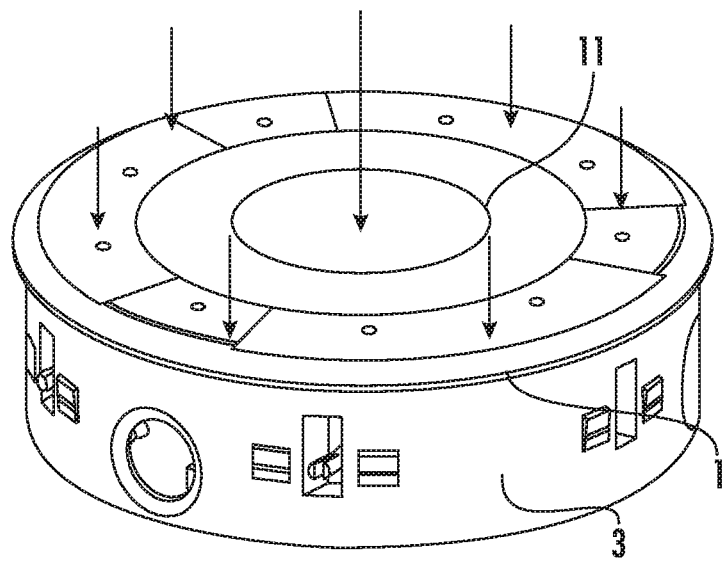
FIG. 2 is a pressing diagrammatic drawing of a new-type multiple knob structure in accordance with an embodiment of the disclosure.

Turning now to FIG. 2, a pressing diagrammatic drawing is provided of a new-type multiple knob structure in accordance with an embodiment of the disclosure. In this embodiment, nine pieces of button 121 are setup on the silicone keyboard 12, nine pieces of button triggers 131 are setup on the head annular PCB 13. It will be understood by those skilled in the art, that the nine pieces of buttons 121 correspond to the nine pieces of button triggers 131.

A slide switch 321 is setup on the bottom PCB 32 of the knob bottom module 3 as illustrated in FIG. 1. The slide switch 321 triggers the knob to rotate.

The new-type multiple knob structure provided by the invention is suitable for applying in knobs with varisized diameters, meanwhile its structure is simple and only a single bearing with lower cost is setup as the main bearing structure. Therefore, it can meet the requirements of the knob structure's application on electrical switch and regulating equipment.

The present invention is disclosed by the preferred embodiment in the aforementioned description; however, it is contemplated for one skilled at the art that the embodiments are applied only for an illustration of the present disclosure rather than are interpreted as a limitation for the scope of the present invention. It should be noted that the various substantial alternation or replacement equivalent to these embodiments shall be considered as being covered within the scope of the present invention.

What is claimed is:

1. A multiple knob structure comprising:
   a knob top module, which includes a head cover, a silicone keyboard and a head annular PCB, from top to bottom;
   a bearing module, which includes a bearing holder and a bearing;
   a knob bottom module, which includes a bottom cover and a bottom PCB;
   wherein the knob bottom module also includes a torsional spring and a rotation damper;
   wherein the torsional spring is mounted on an installing groove of the bottom cover and is configured to resist clockwise and anti-clockwise rotation of the knob top module and to return the knob top module to an equilibrium position after rotation,
   wherein the rotation damper is mounted on a rotation damper installing groove of the bottom cover and is configured to slow the return of the knob top module to the equilibrium position;
   wherein a plurality of buttons are disposed on the silicone keyboard, and a corresponding plurality of button triggers are disposed on the head annular PCB, the buttons corresponding to the button triggers;
   wherein the plurality of buttons are configured such that pressing any one button triggers the corresponding button trigger and activates the knob structure.

2. The knob structure as claimed in claim 1, wherein the bearing is mounted on a bearing seat of the bottom cover, the bearing seat is setup on a middle axle of the bottom cover.

3. The knob structure as claimed in claim 1, further comprising a vertical press module comprised of the head cover, the silicone keyboard, the head annular PCB, and the bearing holder; wherein the vertical press module is mounted on a periphery of the bearing, and the vertical press module is mounted on the bottom cover.

4. The knob structure as claimed in claim 1, wherein the plurality of buttons comprise nine buttons and the plurality of button triggers comprise nine button triggers.

5. The knob structure as claimed in claim 1, wherein a slide switch is setup on the bottom PCB of the knob bottom module.

6. The knob structure as claimed in claim 1, wherein the knob structure is configured to be activated when the knob top module is rotated about thirty degrees.

7. The knob structure as claimed in claim 6, wherein the rotation of the top knob module is restricted to about thirty degrees.

\* \* \* \* \*